(12) United States Patent
Moon et al.

(10) Patent No.: US 8,901,883 B2
(45) Date of Patent: Dec. 2, 2014

(54) CHARGER FOR ELECTRIC VEHICLE

(75) Inventors: Tae Kyung Moon, Seoul (KR); Hyung Tae Moon, Seoul (KR); Gun Haeng Heo, Gyeonggi-do (KR); Sung Min Oh, Gyeonggi-do (KR); Jin Hwan Lee, Gyeonggi-do (KR)

(73) Assignee: Mando Corporation, Pyeongtaek-Si, Gyeonggi-Do (KR)

( * ) Notice: Subject to any disclaimer, the term of this patent is extended or adjusted under 35 U.S.C. 154(b) by 451 days.

(21) Appl. No.: 13/414,332

(22) Filed: Mar. 7, 2012

(65) Prior Publication Data

US 2012/0229088 A1 Sep. 13, 2012

(30) Foreign Application Priority Data

Mar. 8, 2011 (KR) .................... 10-2011-0020389

(51) Int. Cl.
| | |
|---|---|
| *H01M 10/46* | (2006.01) |
| *H02J 7/02* | (2006.01) |
| *H02M 1/10* | (2006.01) |
| *H02J 1/02* | (2006.01) |
| H02M 3/338 | (2006.01) |
| H02M 1/42 | (2007.01) |
| H02M 1/00 | (2006.01) |
| H02M 3/158 | (2006.01) |

(52) U.S. Cl.
CPC ............ *H02J 7/022* (2013.01); *Y02T 90/127* (2013.01); *H02M 3/3382* (2013.01); *H02M 1/10* (2013.01); *Y02B 70/126* (2013.01); *H02M 1/4225* (2013.01); *H02M 2001/007* (2013.01); *Y02T 10/92* (2013.01); *H02M 3/1584* (2013.01); *H02M 2001/0077* (2013.01); *H02J 1/02* (2013.01)

USPC .......................................................... 320/109

(58) Field of Classification Search
CPC ..... Y02T 10/7005; H92J 7/022; H92J 7/0093; H92J 7/008
USPC .......................... 320/104, 109, 140, 141, 145
See application file for complete search history.

(56) References Cited

U.S. PATENT DOCUMENTS

| 7,069,171 B2 * | 6/2006 | Wang et al. .................... 702/145 |
| 2012/0049794 A1 * | 3/2012 | Han et al. ........................ 320/109 |

FOREIGN PATENT DOCUMENTS

| CN | 201438679 U | 4/2010 |
|---|---|---|
| CN | 201479003 U | 5/2010 |
| JP | 2008-211895 A | 9/2008 |
| JP | 2009-171836 A | 7/2009 |
| JP | 2010-206941 A | 9/2010 |
| KR | 20-1999-0030729 | 7/1999 |
| KR | 10-2003-0000538 A | 6/2001 |
| KR | 10-0944528 B1 | 3/2010 |

OTHER PUBLICATIONS

Chinese Office Action issued in Chinese Patent Application No. CN 201210059517.9 dated Dec. 23, 2013.

(Continued)

*Primary Examiner* — Edward Tso
(74) *Attorney, Agent, or Firm* — McDermott Will & Emery LLP

(57) ABSTRACT

Disclosed herein is a charger for electric vehicles, which has a wide output voltage range. The charger is a slow charger having an improved configuration to respond to a wide output voltage range as well as output change. The charger may achieve limited switching loss and reduced noise via soft-switching operation, thereby enabling high-efficiency large-power Power Factor Correction (PFC) and increasing conversion efficiency of a DC/DC converter.

5 Claims, 2 Drawing Sheets

(56) References Cited

OTHER PUBLICATIONS

Korean Office Action issued in Korean Patent Application No. KR 10-2011-0020389 dated Dec. 6, 2013.

Yao Gang et al., "A New Soft Switching Circuit for the Interlayered Boost Converters," Proceedings of the CSEE, vol. 25, No. 10, May 2005; © Chin. Soc. for Elec. Eng.; w/ English abstract thereof.

* cited by examiner

CHARGER FOR ELECTRIC VEHICLE

CROSS-REFERENCE TO RELATED APPLICATION

This application claims the benefit of Korean Patent Application No. 2011-0020389, filed on Mar. 8, 2011 in the Korean Intellectual Property Office, the disclosure of which is incorporated herein by reference.

BACKGROUND

1. Field

Embodiments of the present invention relate to a charger for electric vehicles, which has a wide output voltage range.

2. Description of the Related Art

Serious global pollution is increasing the importance of using pollution-free energy. In particular, air pollution in major cities is getting worse and one cause thereof is exhaust fumes of vehicles.

In this situation, a study to commercialize so-called electric vehicles whose power source is electricity that is pollution-free energy is actively being progressed. Electric vehicles charge a battery with electric energy supplied from an external station, and obtain mechanical energy from the charged battery voltage via a motor coupled to vehicle wheels.

Thus, to drive the motor using the charged battery voltage, the electric vehicles include a high-capacity rechargeable battery and a battery charger to charge the high-capacity rechargeable battery.

Battery chargers are classified into a fast charger and a slow charger based on charging time. The fast charger is installed at a place for immediate charging during traveling, such as a filling station, and takes about 20 minutes to charge. On the other hand, the slow charger is installed at a place where long-term parking is expected, such as a parking lot or shopping mall, and takes about 5 hours to charge.

These battery chargers are not designed to use all AC input voltages, i.e. commercial voltages of 110V/220V, but designed to use a single AC input voltage, and have a narrow output voltage range upon charging.

SUMMARY

Therefore, it is one aspect of the present invention to provide a charger for electric vehicles, which is of a slow charger type whose configuration is changed to respond to a wide output voltage range as well as output change.

It is another aspect of the present invention to provide a charger for electric vehicles, which achieves limited switching loss and reduced noise via soft switching operation using phase control, thereby enabling high-efficiency large-power Power Factor Correction (PFC) and increasing conversion efficiency of a DC/DC converter.

Additional aspects of the invention will be set forth in part in the description which follows and, in part, will be obvious from the description, or may be learned by practice of the invention.

In accordance with one aspect of the present invention, a charger for electric vehicles includes a nose filter connected to a commercial power source to remove high-frequency nose, an interleave Power Factor Correction (PFC) unit connected to the noise filter to correct a power factor in a continuous current mode, a DC/DC converter connected to the interleave PFC unit to convert a DC voltage via soft switching operation using phase control, and a series-parallel conversion unit connected to the DC/DC converter to output a DC voltage of about 150V to about 420V by changing a turns ratio of a boosting transformer.

The charger may further include a controller that outputs switching signals to control operations of the interleave PFC unit, DC/DC converter and series-parallel conversion unit.

The interleave PFC unit may include inductors for power factor correction of an input DC voltage rectified by a rectification unit that rectifies commercial power, first and second switching devices connected respectively to the inductors to reduce switching loss via soft switching operation, and a driver to operate the first and second switching devices upon receiving the switching signals of the controller.

The DC/DC converter may include third to sixth switching devices to reduce switching loss via soft switching operation, a driver to operate the third to sixth switching devices upon receiving the switching signals of the controller, and a transformer to boost an output voltage based on a turns ratio.

The series-parallel conversion unit may include a seventh switching device that is operated upon receiving the switching signals of the controller to change a turns ratio of the transformer via series or parallel driving of turns at an output end of the transformer.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
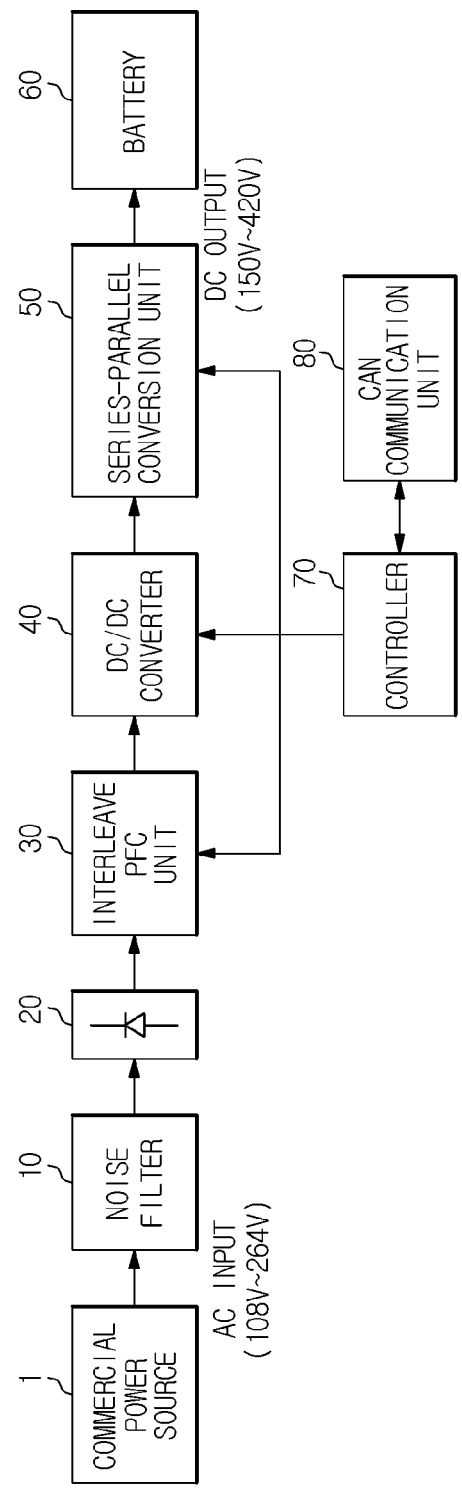
FIG. 1 is a block diagram illustrating a configuration of a charger for electric vehicles according to an embodiment of the present invention.

Reference will now be made in detail to the embodiment of the present invention, examples of which are illustrated in the accompanying drawings, wherein like reference numerals refer to like elements throughout.

FIG. 1 is a block diagram illustrating a configuration of a charger for electric vehicles according to an embodiment of the present invention.

In FIG. 1, the charger for electric vehicles according to the embodiment of the present invention includes a noise filter 10, a rectification unit 20, an interleave Power Factor Correction (PFC) unit 30, a DC/DC converter 40, a series-parallel conversion unit 50, a battery 60, a controller 70, and a Controller Area Network (CAN) communication unit 80.

The noise filter 10 is connected to a commercial power source 1 that inputs an AC voltage of 108V to 264V. The noise filter 10 functions to suppress externally generated high-frequency noise and internally generated high-frequency noise.

The interleave PFC unit 30 is connected to the noise filter 10 and performs Power Factor Correction (PFC) and harmonic control via interleaved operation thereof.

The rectification unit 20 is interposed between the noise filter 10 and the interleave PFC unit 30 and functions to rectify an AC input voltage of 108V to 264V passed through the noise filter 10.

The DC/DC converter 40 is connected to the interleave PFC unit 30. The DC/DC converter 40 may be a converter that is operated via pulse width modulation, such as a forward converter and a half bridge converter, a quasi-resonant flyback converter having improved switching properties, or a Logical Link Control (LLC) resonant converter.

Generally, the DC/DC converter 40 generates a pulse signal by switching a DC input voltage, boosts or decreases the pulse signal using a coil, capacitor, transformer, etc. as necessary and thereafter again rectifies the pulse signal to convert the pulse signal to a desired DC output voltage.

In the embodiment, the DC/DC converter 40 achieves limited switching loss and reduced noise via soft switching operation using phase control, thereby increasing DC voltage conversion efficiency.

The series-parallel conversion unit 50 is connected to the DC/DC converter 40. The series-parallel conversion unit 50 functions to boost the converted DC output voltage from the DC/DC converter 40 and output a DC voltage having a wide output range of 150V to 420V.

The series-parallel conversion unit 50 further functions to change a turns ratio if a wide DC output voltage range is necessary via full-bridge phase control.

The battery 60 is a rechargeable battery that is charged with the wide output range of DC voltage output from the series-parallel conversion unit 50.

The controller 70 controls operations of the interleave PFC unit 30, DC/DC converter 40 and series-parallel conversion unit 50.

Additionally, the controller 70 controls switching operation of the interleave PFC unit 30 based on an input voltage and a required output voltage to easily respond to power conversion and also, controls switching operation of the series-parallel conversion unit 50 to respond to a wide output range of DC voltage.

The CAN communication unit 80 performs communication with the controller 70 and other control devices.

Figure 2:
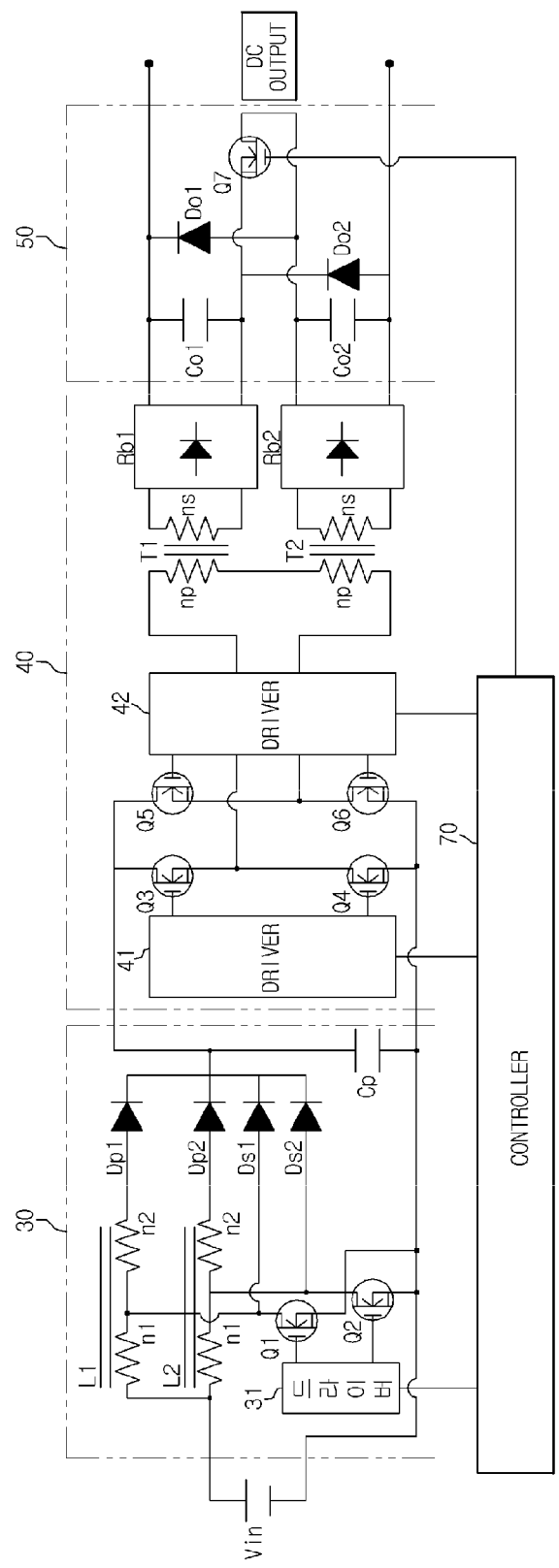
FIG. 2 is a detailed circuit diagram of the charger for electric vehicles according to the embodiment of the present invention.

FIG. 2 is a detailed circuit diagram of the charger for electric vehicles according to the embodiment of the present invention.

In FIG. 2, the interleave PFC unit 30 achieves high-efficiency large-power PFC to respond to a wide output voltage range and output change in a continuous current mode. The interleave PFC unit 30 includes two inductors L1 and L2 for power factor correction of an input DC voltage Vin rectified by the rectification unit 20, first and second switching devices Q1 and Q2 which are connected respectively to the two inductors L1 and L2 to reduce switching loss via soft switching operation, a driver 31 which is connected to the first and second switching devices Q1 and Q2 and applies switching signals of the controller 70 to the first and second switching devices Q1 and Q2 to operate the first and second switching devices Q1 and Q2, diodes Dp1, Dp2, Ds1 and Ds2 connected to the first and second switching devices Q1 and Q2, and an output capacitor Cp which is charged with energy applied through the first and second switching devices Q1 and Q2 to output a DC voltage.

The DC/DC converter 40 is an LLC boosting circuit which achieves reduced switching loss and noise via soft switching operation using phase control, thereby increasing power conversion efficiency. The DC/DC converter 40 includes third to sixth switching devices Q3 to Q6 to reduce switching loss via soft switching operation, drivers 41 and 42 which are connected to the third to sixth switching devices Q3 to Q6 and apply switching signals of the controller 70 to the third to sixth switching devices Q3 to Q6 to operate the third to sixth switching devices Q3 to Q6, two transformers T1 and T2 each having an input end and an output end to boost an output voltage based on a turns ratio, and two synchronization rectifiers Rb1 and Rb2 which are connected to the two transformers T1 and T2 and again rectify output voltages of the transformers T1 and T2 to keep the output voltages at link voltages.

The series-parallel conversion unit 50 serves to change a turns ratio of the boosting transformers T1 and T2 and output a DC voltage having a wide output range of 150V to 420V. The series-parallel conversion unit 50 includes filter capacitors Co1 and Co2 and diodes Do1 and Do2 which are connected to output ends of the two synchronization rectifiers Rb1 and Rb2 for voltage stabilization, and a seventh switching device Q7 which changes the turns ratio of the transformers T1 and T2 up to 2 times via series or parallel driving of turns at the output ends of the transformers T1 and T2. The seventh switching device Q7 is operated upon receiving switching signals of the controller 70.

Hereinafter, operation and effects of the charger for electric vehicles having the above described configuration will be described.

FIG. 1 is a block diagram illustrating a configuration of the charger for electric vehicles according to the embodiment of the present invention, and FIG. 2 is a detailed circuit diagram of the charger for electric vehicles according to the embodiment of the present invention.

In FIGS. 1 and 2, the rectification unit 20 rectifies an AC input voltage of 108V to 264V passed through the noise filter 10. The interleave PFC unit 30 boosts the rectified voltage in a continuous current mode of soft switching.

The interleave PFC unit 30 outputs a DC voltage to respond to a wide output voltage range and output change via soft switching operation in which the first and second switching devices Q1 and Q2 connected in parallel to each other are respectively or simultaneously operated based on an input voltage and a required output voltage.

The DC voltage output from the interleave PFC unit 30 is applied to the DC/DC converter 40 connected to a rear end of the interleave PFC unit 30. The DC/DC converter 40 achieves limited switching loss and reduced noise via soft switching operation using phase control, thereby converting the DC voltage into a desired DC output voltage.

The converted DC output voltage from the DC/DC converter 40 is applied to the series-parallel conversion unit 50 connected to a rear end of the DC/DC converter 40. The series-parallel conversion unit 50 performs series or parallel driving of the turns at the output ends of the transformers T1 and T2 based on switching operation of the seventh switching device Q7, thereby outputting a DC voltage having a wide output range of 150V to 420V to the battery 60.

As is apparent from the above description, a charger for an electric vehicle according to the embodiment of the present invention is a slow charger having an improved configuration to respond to a wide output voltage range as well as output change. The charger may achieve limited switching loss and reduced noise via soft-switching operation, thereby enabling high-efficiency large-power Power Factor Correction (PFC) and increasing conversion efficiency of a DC/DC converter.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:
1. A charger for electric vehicles, the charger comprising:
   a noise filter connected to a commercial power source to remove high-frequency noise;
   an interleave Power Factor Correction (PFC) unit connected to the noise filter to correct a power factor in a continuous current mode;
   a DC/DC converter connected to the interleave PFC unit to convert a DC voltage via soft switching operation using phase control; and a series-parallel conversion unit connected to the DC/DC converter to output a DC voltage of about 150V to about 420V by changing a turns ratio of a boosting transformer.

2. The charger according to claim 1, further comprising a controller that outputs switching signals to control operations of the interleave PFC unit, DC/DC converter and series-parallel conversion unit.

3. The charger according to claim 2, wherein the interleave PFC unit includes inductors for power factor correction of an input DC voltage rectified by a rectification unit that rectifies commercial power, first and second switching devices connected respectively to the inductors to reduce switching loss via soft switching operation, and a driver to operate the first and second switching devices upon receiving the switching signals of the controller.

4. The charger according to claim 2, wherein the DC/DC converter includes third to sixth switching devices to reduce switching loss via soft switching operation, a driver to operate the third to sixth switching devices upon receiving the switching signals of the controller, and a transformer to boost an output voltage based on a turns ratio.

5. The charger according to claim 4, wherein the series-parallel conversion unit includes a seventh switching device that is operated upon receiving the switching signals of the controller to change a turns ratio of the transformer via series or parallel driving of turns at an output end of the transformer.

* * * * *